(12) United States Patent
Russell et al.

(10) Patent No.: US 6,749,872 B2
(45) Date of Patent: Jun. 15, 2004

(54) HEME SUPPLEMENT AND METHOD OF USING SAME

(75) Inventors: Louis Russell, Ames, IA (US); Joy M. Campbell, Ames, IA (US); Francisco Javier Polo Pozo, Ames, IA (US)

(73) Assignee: The Lauridsen Group Incorporated, Ankey, IA (US)

( * ) Notice: Subject to any disclaimer, the term of this patent is extended or adjusted under 35 U.S.C. 154(b) by 299 days.

(21) Appl. No.: 10/061,478

(22) Filed: Feb. 1, 2002

(65) Prior Publication Data

US 2003/0170344 A1 Sep. 11, 2003

(51) Int. Cl.$^7$ .................................................. A23J 1/06
(52) U.S. Cl. ........................... 426/2; 426/647; 426/657; 426/805; 426/807
(58) Field of Search ........................... 426/2, 647, 657, 426/805, 807

(56) References Cited

U.S. PATENT DOCUMENTS

| | | | | |
|---|---|---|---|---|
| 688,604 A | * | 12/1901 | Dietrich et al. ............. 530/363 |
| 778,783 A | * | 12/1904 | Hofmeier ..................... 426/531 |
| 884,026 A | * | 4/1908 | Langer ........................ 426/647 |
| 4,098,780 A | * | 7/1978 | Lindroos ..................... 530/420 |
| 4,330,463 A | * | 5/1982 | Luijerink .................... 530/385 |
| 4,431,581 A | * | 2/1984 | Lindroos ..................... 530/385 |
| 4,446,066 A | * | 5/1984 | Luijerink .................... 530/380 |
| 4,761,472 A | * | 8/1988 | Schultze ..................... 540/145 |
| 5,151,500 A | * | 9/1992 | Wismer-Pedersen et al. ............ 530/385 |
| 5,880,266 A | * | 3/1999 | De Buyser .................. 530/385 |
| 6,387,419 B1 | * | 5/2002 | Christensen .................. 426/2 |
| 6,534,104 B1 | * | 3/2003 | DeRouchey et al. ........ 426/240 |

FOREIGN PATENT DOCUMENTS

EP 0256912 * 2/1988

* cited by examiner

*Primary Examiner*—C. Sayala
(74) *Attorney, Agent, or Firm*—Schwegman, Lundberg, Woessner & Kluth, P.A.

(57) ABSTRACT

A feed supplement is disclosed comprising heme purified from animal blood. Animals fed this supplement experience a significantly lower average daily gain and average daily feed intake when compared with feed supplemented with fishmeal or AP 301. Only the animals fed the heme supplement exhibit improved meat quality, including improved meat color and drip loss.

29 Claims, No Drawings

HEME SUPPLEMENT AND METHOD OF USING SAME

FIELD OF THE INVENTION

This invention relates to the manufacture and use of a novel heme supplement for livestock.

BACKGROUND OF THE INVENTION

The ultimate goal in commercial pork production is to efficiently produce a high quality pork. Efficiency in production is closely related to profitability, i.e. to maximize the difference between the value of the pork (quantity and meat quality) and costs of production (feed, capital, labor, and services).

Feed intake is closely related to growth rate, feed conversion, carcass value and, thus, profitability. Feed intake is affected by a whole range of factors, associated with the animal, such as body weight, sex, and genotype. Feed intake is also affected by the content of the feed (energy density, large nutrient imbalances, freshness, presence of toxins, processing), and various environmental factors.

It is important to develop a feeding program where the animal's requirements for nutrients are closely met for two primary reasons. First, underfeeding of nutrients will reduce animal performance, carcass value, and profitability. Second, overfeeding of nutrients will unnecessarily increase feeding cost and will not result in any improvement in animal performance. Diets should thus be formulated to meet the unique requirements of various groups of pigs managed under various conditions.

Types of nutrients that should be contained in the animal's diet include protein, energy, minerals, vitamins, and water. A properly formulated diet contains the amount of each nutrient needed for efficient growth, milk production, pregnancy, or maintenance.

With respect to protein, the animals' diet must include a sufficient amount to supply the necessary amino acids. Synthetic lysine, methionine, threonine, and tryptophan are common ingredients in swine diets.

The energy in a swine diet is a major factor in all body functions. Metabolizable energy (ME) is the portion of the total energy content (gross energy) that is available for these functions. Pigs use carbohydrates (starch), fat, and protein to meet their ME requirement.

Minerals are also of high importance in swine diets, and are classified as macro- or micro-minerals. Macro-minerals include calcium, phosphorus, and salt while micro-minerals include iron, zinc, copper, manganese, iodine, and selenium. Pigs require other minerals, but their levels are usually high enough in typical feed ingredients.

Fat-soluble vitamins required in swine diets are vitamins A, D, E, and K. Water-soluble vitamins required in swine diets include riboflavin, niacin, pantothenic acid, choline, and vitamin B12. All classes of swine require other vitamins, but the levels in common feedstuffs are generally adequate.

Several common feed ingredients do not fit any of the above-referenced groups, but are still important. Whey is a by-product from milk processing used in diets for young pigs. Dried whole whey contains over 60 percent lactose. Also, lactose is an excellent source of energy for pigs after weaning. In addition, fat is often used to increase the energy content of swine feed. Animal fat contains more than twice as much energy as corn.

Another issue related to feeding which has great economic implications is the effect on carcass lean-to-fat ratios. With greater adoption of carcass value-based buying systems, producers are being heavily docked for below average lean percentages and rewarded for leaner animals. Some packers are calling for producers to change their diets, especially to remove added fat, in order to reduce carcass fat. Any such decision is necessarily based on the net effects of reduced dietary fat on growth, feed costs per pound of gain and sale price.

The amount and quality of feed which pigs consume depends largely upon the animal's stage of life. For instance, young pigs need to have fresh food available to them ad libitum. Weaning pigs have a small stomach which limits the amount they can eat, and therefore require a high quality diet.

Pigs weighing 40 to 125 pounds (18.2 to 56.8 kg) and/or about nine weeks of age are referred to as growing pigs. Most pigs, depending on genotype, can be fed ad libitum to this age or weight. From 125 pounds (56.8 kg) to market weight (about 230 pounds, or 104.5 kg) pigs are referred to as finishing pigs. As a pig grows, the total amount of dietary protein it needs each day also increases. Pigs should be switched from the grower (nutrient dense/more protein) to the finisher (less dense) diet when they weigh about 125 pounds (56.8 kg).

The finishing stage of feed consumption offers the greatest opportunity for improving feed efficiency and savings. The major feeding decisions involve selecting the most economical energy sources and matching nutrient content with actual feed intake and genetic potential for lean growth. The goal is to reduce feed costs per pound of gain while maintaining rapid daily gains and acceptable carcass quality.

In growing pigs, up to approximately 110 pounds (50 kg) live body weight, energy intake generally limits lean growth. In these pigs, the daily energy intake should be maximized. In contrast, finishing pigs, especially those with medium or unimproved lean growth potentials and consuming large quantities of feed, consume more energy than what is required for lean growth. In these pigs excessive body fat is deposited and as a result, carcass value is reduced. In finishing pigs with unimproved or average lean growth potentials, carcass value and feed efficiency can be improved by restricting the daily energy intake.

An obvious means of restricting the daily energy intake of finishing pigs and other livestock is to physically restrict the amount of feed consumed by the animals. This method presents difficulties, however, due to the time and expense required in monitoring each animal's feed consumption. There is also the risk that the animal will fail to consume the requisite amount of nutrients.

The addition of fat to finisher diets reduces the pounds of feed consumed per day. However, while adding fat to the animals' diets improves feed conversion, it often results in increased backfat.

Increasing the amount of protein in the diet reduces the amount of feed required per pound of gain. However, the addition of protein to the diet substantially increases the cost of the animal feed.

It is therefore an object of the present invention to provide a means of economically limiting the average daily gain and average daily feed intake of finishing pigs and other livestock.

A further object of the invention is to provide a means of limiting the average daily gain and average daily feed intake of finishing pigs and other livestock while providing the animal an ad libitum diet.

A further object of the invention is to provide a means of limiting the average daily gain and average daily feed intake of finishing pigs and other livestock which provides a healthy diet for the animal with the requisite amount of vitamins and nutrients.

A further object of the invention is to provide a means of limiting the average daily gain and average daily feed intake of finishing pigs and other livestock which is economical and easy to use.

Still a further object of the invention is to provide a means of limiting the average daily gain and average daily feed intake of finishing pigs and other livestock which provides a low percentage of carcass fat and a relatively high lean percentage.

It is yet a further object of the invention to provide a means of limiting the average daily gain and average daily feed intake of finishing pigs and other livestock which provides the animals the requisite levels of nutrients and energy requirements.

It is still a further object of the invention to provide a means of improving meat color and reducing drip loss during cooking of the meat of finishing pigs and other livestock.

These and other objectives will become clear from the following detailed description of the invention.

SUMMARY OF THE INVENTION

This invention provides for the first time a heme-containing animal supplement that limits the average daily gain and average daily feed intake of finishing pigs and other livestock. According to the present invention, blood (porcine, bovine, ovine, equine, or avian) is collected and separated into red blood cells and plasma. The red blood cells are then optionally hydrolyzed to separate the heme from the globin. The resulting heme component, with or without the globin, is then preferably concentrated and dried.

The product of the invention may be added to animal feed as a supplement. Animals treated with the heme supplement experience a significant decrease in average daily gain and average daily feed intake. The use of the heme supplement further decreases feed costs/pound of animal gain while maintaining rapid daily gains and acceptable carcass quality. Further, the heme supplement has been shown to improve animal meat quality factors, including meat color and drip loss.

DETAILED DESCRIPTION OF THE INVENTION

According to the present invention, heme obtained from animal sources is concentrated and fed with other feed ingredients to animals such as pigs and calves. Any animal in which it is desirable to decrease growth and feed intake can be fed the composition according to this invention. This includes but is not limited to cats, dogs, calves, sheep, pigs, chickens, turkeys, ducks, horses, goats, or aquaculture.

The heme is obtained by collecting blood from animals. The blood from any red blooded animal (i.e. porcine, bovine, ovine, equine, avian, etc.) can be used to practice the invention. In a preferred embodiment, the animal is a livestock animal which is slaughtered for its meat product. The blood, which is traditionally discarded or dried and processed as blood meal, may then be used for preparation of the compositions and implementation of methods of this invention. In a most preferred embodiment, the blood is collected from pigs or cattle.

Generally, according to the invention, blood is collected, preferably at slaughter plants. In one embodiment, the blood may be held in a circulating stainless steel tank with anticoagulants such as sodium citrate or sodium phosphate to prevent clotting.

Typically, the whole blood is then separated, preferably by centrifugation, although any other separation method may be used, into two parts, the red blood cells with other cellular components and the plasma and other cellular components. Separation of red blood cells from plasma are methods known and commonly practiced by those of skill in the art. After separation, the red blood cells may be stored in an insulated tank until ready to further process.

The red blood cells are then optionally hydrolyzed to separate the heme from the globin. Hydrolysis procedures are well known in the art and generally involve enzymatic digestion. Other appropriate hydrolysis methods/agents include enzymes, acids, alkalines, and proteolytic preparations. A preferred method of hydrolyzing red blood cells involves the use of alkaline proteases or papain. The heme and globin are then separated using conventional separation equipment. Generally, this procedure includes filtration, ultrafiltration, microfiltration, centrifugation, fluid bed, and precipitation. In the alternative, unseparated red blood cells may proceed directly to the next processing step.

As used herein, the term "substantially purified heme" is intended to encompass whole red blood cells and/or the heme component of red blood cells separated from the globin component. The substantially purified heme of this invention is removed from its natural environment, isolated or separated, and is at least 60% free, preferably 75% free, and most preferably 90% free from other blood components with which it is naturally associated. As used herein, the term "substantially free of other blood components" refers to the fact that the heme supplement does not contain sufficient amounts of plasma, white blood cells or platelets so as to interfere with the effectiveness of the heme supplement for its disclosed purpose.

Similarly, the term "substantially free of globin" refers to the heme component from red blood cells that is at least 60% free, preferably 75% free, and most preferably 90% free from the globin component.

The substantially purified heme, either separated or unseparated from the globin, may then be further concentrated, preferably by evaporation. The concentrated heme has a preferred solids concentration of at least about 10% by weight, with between about 10% to 30% solids content being most preferred. The concentrated product is next dried in a manner so as to maintain the structural integrity of the compound. Such drying methods include, but are not limited to, spray drying, vacuum drying, and freeze drying. The dried heme product has a preferred moisture content of less than about 10%, with about 4–7% being preferred. If spray-drying is employed, it should occur at temperatures low enough to prevent the complete denaturation of the heme, but high enough to eliminate bacterial and viral contamination. Traditionally, a drier inlet temperature of approximately 220–300° C., and an outlet temperature from the drier of about 85–110° C. will accomplish this objective. The resulting heme powder will have a particle size of about 5 to about 65 microns.

A preferred spray-dried heme product for use in this invention is manufactured by APC, Inc., and is sold under the brand name AP 301. The process for manufacturing AP 301 is as follows. First, red blood cells are chilled and received by a tanker following separation from the plasma. The red blood cells are then pumped to a holding silo. The red blood cells are next pumped into a dryer wherein they are spray-dried to a moisture content of no greater than 9% by weight.

The resulting heme substance may then be combined with other feed ingredients for any desired feeding regime. The diets consist primarily of processed grains (corn, wheat, barley, rice, etc.), gelatinized starches, milk products (dried skim milk, dried whey, lactose, dried whey protein concentrate, casein, etc.), sugars (dextrose, glucose, sucrose,), fats and/or oils (lard, grease, vegetable oils, coconut oil, etc), animal proteins (fishmeal, bloodmeal, meat meal, etc.), and refined, extruded soybeans (soy protein isolate, soy protein concentrate). The amount of the heme supplement is an amount at which the decreased average daily gain occurs. The heme supplement preferably comprises from greater than 0 to about 10% by weight of the base feed, and most preferably greater than 0 to about 5% by weight of the base feed.

Further, because the pig is an analogous gastrointestinal model for the human infant, it is anticipated that the present invention can also be used in conjunction with human supplementation.

The following examples serve to better illustrate the invention described herein and are not intended to limit the invention in any way. Those skilled in the art will recognize that there are several different parameters which may be altered using routine experimentation and which are intended to be within the scope of this invention.

EXAMPLE 1

Preferred Method of Preparing Heme Supplement

Raw Material Collection

Red blood cells are chilled to <5° C. after separation from plasma.

Raw Material Arrival

Red blood cells are pumped into a storage silo.

Raw Material Storage

Store red blood cells in an insulated silo that is capable of holding the temperature at <5° C.

Red Blood Cell Hydrolysis

1. Pump red cells (30% solids) into the processing tanks.
2. Dilute the cells to 8%16% solids with hot water (70° C. to 75° C.) and heat to 63° C.±2° C.
3. Add the enzyme (e.g. bacterial alkaline protease). To determine the enzyme weight, multiply the total weight of the diluted red cells by the percent solids and then by 90% (protein to solids ratio) and then again by 0.60 to 0.80% (enzyme to protein ratio).
4. Hold the pH between 7.0 to 8.0 with the required amount of 25% sodium hydroxide as added.
5. Hydrolyze for 4–6 hours at 63° C.±3° C. from the time the enzyme was added.
6. Deactivate the enzyme by slowly lowering the pH to 3.5–4.0 with 15% hydrochloric acid.
7. Heat the hydrolyzed cells to 65° C.±5° C.

Separation

1. Warm the separation equipment to 60° C. to 65° C. with tap water.
2. Use an unagitated jacketed tank as the feed tank for the separation equipment to remove entrained air from the hydrolyzed red blood cells. Place a 30 mesh sock filter between the tank and the separation equipment.
3. Start the separation equipment and set the concentration factor at 2.0X to 3.0X. Set the permeate flow rate to 80–90 liters per minute from the PS1000 or 35–40 liters per minute for the PS 400.
4. Pump the globin and the heme directly into storage silos.

Evaporation

1. Adjust the pH of the heme up to 5.5 to 6.5 with 25% sodium hydroxide.
2. Using an evaporator, concentrate to a minimum of 15% solids.

Drying

Spray dry to a moisture content of 4% to 7%.

Packaging

Place heme supplement in 50 pound bags.

EXAMPLE 2

Comparison of AP 301 and Heme

Table 1 below compares the compositions of AP 301 and heme made in accordance with the method of Example 1:

TABLE 1

| General Breakdown of AP 301 versus Heme | | |
|---|---|---|
| Item | AP 301 | Heme |
| Crude Protein, % by wt. | 92 | 84 |
| Moisture, % by wt. | 4 | 7 |
| Ash, % by wt. | 4 | 9 |
| Iron, ppm | 1800–2500 | 3500–5000 |

EXAMPLE 3

Evaluation of Heme Supplement in Weanling Pig Diets

Objective

To determine the impact of dietary inclusion of heme and AP 301 compared to select menhaden fishmeal on average daily gain, average daily feed intake, and feed efficiency.

Facilities, Animals, and Treatments 288 pigs averaging 5.87 kg were randomly allotted by sex to a completely randomized design. Experimental units were represented by 4×8 ft. pens containing 12 pigs (equal ratio of barrows and gilts) per pen with 6 replications per treatment. All pigs were fed the same phase I diet from d 0–7 post-weaning. The dietary treatments (Table 2) consisted of select menhaden fishmeal, 2% AP 301, 2% Heme, and 1% AP 301+1% Heme from d 7–21 post-weaning. The calculated analysis of the dietary treatments is presented in Table 3. Diets were provided at ad libitum access. Individual body weights and pen feed intakes were determined on d 0, 7, 14, and 21.

Data Analysis

Data were analyzed as a completely randomized design. Analysis of variance was performed using the General Linear Models procedure of SAS (SAS/STAT Version 8.0, SAS Institute, Cary, N.C.). Body weight on day 7 was used as a covariate in all performance analyses from d 7–21 post-weaning.

Results

The results are presented in Table 4.

Conclusions

1. There were no significant differences noted between control and AP 301.
2. The addition of 2% Heme significantly reduced ADG and ADFI relative to that of the control or AP 301—fed pigs.

TABLE 2

Composition of Dietary Treatments (% by weight)

| Ingredient | Control | AP 301 | Heme | AP 301/Heme |
|---|---|---|---|---|
| Corn | 53.737 | 54.543 | 54.605 | 54.573 |
| SBM, 47% | 25 | 25 | 25 | 25 |
| Dried Whey | 6.29 | 6.29 | 6.29 | 6.29 |
| AP 301 | 0 | 2 | 0 | 1 |
| Heme | 0 | 0 | 2 | 1 |
| Lactose | 2.62 | 2.62 | 2.62 | 2.62 |
| SM Fishmeal | 6 | 2.29 | 2.185 | 2.238 |
| Soy Oil | 2.703 | 2.842 | 2.859 | 2.85 |
| Limestone | 0.232 | 0.405 | 0.409 | 0.407 |
| 18.5% Dical | 1.283 | 1.817 | 1.832 | 1.825 |
| Salt | 0.2 | 0.2 | 0.2 | 0.2 |
| Additive (Mecadox) | 1 | 1 | 1 | 1 |
| Zinc Oxide, 72% | 0.3 | 0.3 | 0.3 | 0.3 |
| Min Premix | 0.15 | 0.15 | 0.15 | 0.15 |
| Vit Premix | 0.25 | 0.25 | 0.25 | 0.25 |
| L-Lysine HCl | 0.181 | 0.179 | 0.179 | 0.179 |
| Methionine | 0.017 | 0.065 | 0.057 | 0.061 |
| L-Threonine | 0.037 | 0.049 | 0.064 | 0.057 |

TABLE 3

Calculated Analysis of Nutrients in Formulations of Table 2 (% by weight)

|  | Control | AP 301 | Heme | 301/Heme |
|---|---|---|---|---|
| ME kcal/lb | 1550 | 1550 | 1550 | 1550 |
| CP | 20.7 | 20.37 | 20.15 | 20.26 |
| Fat | 5.53 | 5.37 | 5.38 | 5.37 |
| Lactose | 7 | 7 | 7 | 7 |
| Na | 0.2 | 0.2 | 0.2 | 0.2 |
| Cl | 0.32 | 0.33 | 0.41 | 0.37 |
| Ca | 0.85 | 0.85 | 0.85 | 0.85 |
| P | 0.75 | 0.75 | 0.75 | 0.75 |
| Lys | 1.4 | 1.4 | 1.4 | 1.4 |
| Met | 0.42 | 0.42 | 0.42 | 0.42 |
| Met + Cys | 0.77 | 0.76 | 0.75 | 0.75 |
| Trp | 0.27 | 0.28 | 0.28 | 0.28 |
| Thr | 0.91 | 0.91 | 0.91 | 0.91 |
| Iso | 1.03 | 0.94 | 0.94 | 0.94 |

TABLE 4

Experimental Results

|  | Control | AP 301 | Heme | AP 301/Heme | SEM |
|---|---|---|---|---|---|
| D 0–7 |  |  |  |  |  |
| ADG, g | 25.97 | 44.89 | 22.62 | 34.10 | 13.75 |
| ADFI, g | 82.02 | 86.54 | 75.11 | 91.44 | 8.36 |
| G/F | −0.28 | 0.61 | −0.12 | 0.29 | 0.35 |
| D 7–14 |  |  |  |  |  |
| ADG, g | 124.38[b] | 119.17[b] | 79.42[a] | 97.61[ab] | 11.82 |
| ADFI, g | 205.16 | 208.7 | 179.22 | 186.63 | 12.91 |
| G/F | 0.58 | 0.55 | 0.36 | 0.52 | 0.09 |
| D 14–21 |  |  |  |  |  |
| ADG, g | 250.17[b] | 253.28[b] | 196.62[a] | 209.76[a] | 15.93 |
| ADFI, g | 333.30[ab] | 340.56[b] | 294.47[a] | 297.05[ab] | 18.1 |
| G/F | 0.74 | 0.68 | 0.62 | 0.70 | 0.04 |

TABLE 4-continued

Experimental Results

|  | Control | AP 301 | Heme | AP 301/Heme | SEM |
|---|---|---|---|---|---|
| D 7–21 |  |  |  |  |  |
| ADG, g | 188.54[b] | 185.82[b] | 139.33[a] | 153.70[a] | 10.76 |
| ADFI, g | 268.72[ab] | 273.94[b] | 236.53[a] | 241.82[ab] | 14.02 |
| G/F | 0.68[b] | 0.63[b] | 0.54[a] | 0.63[b] | 0.04 |

[ab]P < 0.10

EXAMPLE 4

Evaluation of Heme Supplement on Performance and Meat Quality in Finishing Pigs

Objective

To determine the effect of heme and AP 301 on performance and meat quality of finishing pigs compared to inorganic or chelate iron.

Facilities, Animals, and Treatments

Sixty-two pigs (Landrace X Large White cross) were randomly assigned to treatment consisting of 16 pens of 4 pigs/pen. The dietary treatments were: 1) control [80 mg/kg Fe from $FeSO_4$]; 2) AP 301; 3) Heme; and 4) $FeSO_4$ $7H_2O$. The level of supplemental iron for treatments 2, 3, and 4 was 83 mg Fe/kg. Composition and calculated analysis of the experimental diets are presented in Table 5. AP 301 is a brand of spray-dried red blood cells. These same diets were used from 42 Kg to the time of slaughter. Pig weights were obtained on day 0, 21, and 47 for boars and 54 for gilts. Boars were slaughtered one week earlier than gilts in order to achieve similar final weights at slaughtor following ante-mortem treatment with a minimum of stress. Pigs were fasted prior to slaughter and processed according to industry methods. The carcasses were weighed and classified with the Hennessy grading probe to measure muscle depth and fat thickness. Semimembranous (SM) and longissimus (LD) muscle pH was measured at 45 min. and 24 h post-slaughtor at the last rib level. Following, the LD muscle was cut and color was measured on the surface (L, a, b, Hue) and chroma (C). Drip loss was determined during 48 hours at 3–4 C on a loin slice following a standard procedure (Honickel, 1998). Myoglobin content of the loin muscle was determined according to Hornsey (1956) in the laboratory.

Data were analyzed as a randomized complete block design using the General Linear Models of SAS.

Results and Discussion

Performance. Performance during the initial 3 weeks is presented in Table 6. No differences were noted between treatments. Performance from 3 weeks to finish (boars 26 d, gilts 33 d) is presented in Table 7. Pigs on the control diet consumed more feed compared to the other treatments. This was most pronounced in the heme treatment, whereby pigs consumed 254 g less (P=0.13) compared to the control. Performance for the overall experiment is presented in Table 8. Similar effects as in the second period were observed indicating a reduction (P=0.15) of feed intake in the heme diet and subsequent improvement (P=0.09) in feed efficiency.

Carcass and Meat Quality Characteristics

Carcass weight, muscle depth, and fat thickness are presented in Tables 9 and 10. No differences (P>0.10) were noted in carcass weight and muscle depth from boars and gilts. Fat thickness was increased (P<0.05) due to consumption of heme compared to AP 301 in boars, while no difference (P<0.10) was noted in gilts. Meat quality data is presented in Tables 11 and 12. Due to external reasons (transportation strike) slight differences occurred on antemortem treatment. Thus, data from boars and gilts are separated and will be discussed individually.

Boars. No differences (P>0.10) were noted in $pH_{45}$ for both muscles studied and are within normal range. Color measurements L and b variables from the loin muscle were increased (P<0.05) in boars due to consumption of control compared to AP 301 and heme indicating a pale and yellow meat in the control group. The Chroma and Hue values were also increased (P<0.05) in the control group compared to the AP 301 indicating more reddish meat from AP 301. Additionally, the drip loss was higher (P<0.05) for the control compared to AP 301 and Heme, indicating that meat from control animals was more exudative. Hematin content was unaffected by treatment.

Gilts. No important differences were noted in pH of the muscles studied. Although not different (P>0.05), the loin meat tended to be paler, less red, and with more Hue (54.9 vs. 50.7) in controls compared to AP 301. As a consequence of this, the muscle became less exudative and the drip loss was higher (8.12 vs. 6.39%) for controls compared to AP 301. Overall, these results indicate that loins from pigs consuming AP 301 were redder and had greater water holding capacity. It is speculated that the values are not significantly different because of the low number of observations per treatment.

Conclusions

In this study, during the second period, pigs consuming heme consumed less feed (P=0.15) compared to the control pigs. As a consequence of this, feed to gain was greater (P=0.15) in the heme group compared to the control group and was further improved (P=0.09) compared to the AP 301 group. No significant differences were noted on carcass weight or muscle depth from boars and gilts. The meat color of the loin area from the control group was different (P<0.05) compared to AP 301 and heme. The difference was significant in the boars and a tendency in the gilts. AP 301 produced better color and more reddish meat followed by the heme treatment compared to the control. Thus, indicating an improvement in meat color. The drip loss was lower in AP 301 and heme treatments compared to the control, indicating improvement in water holding capacity. Overall, AP 301 produced better meat quality, followed by heme being better than the iron supplement, while feed intake was decreased and feed efficiency improved from consumption of heme.

TABLE 5

Composition of the basal diets (%)

| Ingredient | T-1 Control | T-2 AP-301 | T-3 Heme | T-4 FeSO$_4$ |
|---|---|---|---|---|
| Wheat | 20.000 | 20.000 | 20.000 | 20.000 |
| Corn | 2.729 | 1.341 | 1.764 | 2.729 |
| Barley | 13.761 | 21.677 | 19.545 | 13.761 |
| Lard | 3.000 | 3.000 | 3.000 | 3.000 |
| Cassava | 22.000 | 22.000 | 22.000 | 22.000 |
| Peas | 15.000 | 15.000 | 15.000 | 15.000 |
| Soybean meal, 44% protein | 15.592 | 6.120 | 8.666 | 15.592 |
| Sunflower meal, 37% protein | 5.000 | 5.000 | 5.000 | 5.000 |
| DL-methionine | 0.053 | 0.074 | 0.059 | 0.053 |
| L-threonine | 0.031 | 0.060 | 0.050 | 0.031 |
| Calcium carbonate | 0.736 | 0.664 | 0.699 | 0.736 |
| Dicalcium phosphate | 1.449 | 1.649 | 1.568 | 1.449 |
| Salt | 0.250 | 0.250 | 0.250 | 0.250 |
| Minerals and vitamins | 0.400 | 0.400 | 0.400 | 0.400 |
| AP-301 | | 2.766 | | |
| Heme protein | | | 2.000 | |
| FeSO$_4$.7H$_2$O (20% Fe) | | | | 0.0415 |
| Estimated nutrient content | | | | |
| Metabolizable energy, kcal/kg | 3100 | 3100 | 3100 | 3100 |
| Crude protein | 17.1 | 16.5 | 16.5 | 17.1 |
| Crude fibre | 5.3 | 5.1 | 5.2 | 5.3 |
| Ether extract | 4.5 | 4.5 | 4.5 | 4.5 |
| Lysine | 0.85 | 0.87 | 0.85 | 0.85 |
| Methionine + cystine | 0.54 | 0.51 | 0.51 | 0.54 |
| Threonine | 0.59 | 0.59 | 0.59 | 0.59 |
| Tryptophan | 0.18 | 0.17 | 0.18 | 0.18 |
| Calcium | 0.75 | 0.75 | 0.75 | 0.75 |
| Inorganic phosphorus | 0.35 | 0.38 | 0.38 | 0.35 |
| Fe (mg/kg) | 80 | 163 | 163 | 163 |

[1]one kg of feed contains: Vitamin A: 5000 IU; Vitamin D$_3$: 1000 IU; Vitamin E: 15 mg; Vitamin B$_1$: 1,3 mg; Vitamin B$_2$: 3,5 mg; Vitamin B$_{12}$: 0.025 mg; Vitamin B$_6$: 1,5 mg; Calcium pantothenate: 10 mg; Nicotinic acid: 15 mg; Biotin: 0.1 mg; Folic acid: 0.6 mg; Vitamin K$_3$: 2 mg; Fe: 80 mg (only the control diet); Cu: 100 mg; Co: 0.75 mg; Zn: 60 mg; Mn: 30 mg; I: 0.75 mg; Se: 0.10 mg; Ethoxiquin: 0.15 mg.

TABLE 6

Performance during the first 3 weeks

| Treatment | Initial weight kg | Final weight kg | Average daily gain g/d | Average daily feed g/d | Feed/Gain g/g |
|---|---|---|---|---|---|
| Control | 42.6 | 61.7 | 910 | 1881 | 2.067 |
| AP-301 | 43.2 | 62.6 | 924 | 2028 | 2.191 |
| Heme | 43.0 | 62.1 | 909 | 1907 | 2.099 |
| FeSO$_4$ | 43.0 | 61.1 | 861 | 1816 | 2.124 |
| Pooled SEM | 0.29 | 0.84 | 34.5 | 73.0 | 0.0585 |

Mean and standard error of pens of 4 pigs (one pen of 3, for treatments control and FeSO$_4$). One pig died at 13 days of Heme.

TABLE 7

Performance from 3 weeks to finish
(boars 26 days, gilts 33 days)

| Treatment | Initial weight kg | Final weight kg | Average daily gain g/d | Average daily feed g/d | Feed/Gain g/g |
|---|---|---|---|---|---|
| Control | 61.7 | 93.7 | 997 | 2630 | 2.678 |
| AP-301 | 62.6 | 93.7 | 973 | 2533 | 2.692 |
| Heme[1] | 62.1 | 93.9 | 989 | 2376 | 2.429 |
| FeSO$_4$ | 61.1 | 92.7 | 978 | 2513 | 2.569 |
| Pooled SEM | 0.84 | 0.82 | 35.6 | 108.8 | 0.1216 |

Mean and standard error of 4 pens of 4 pigs (one pen of 3, for treatments control, Heme, and FeSO$_4$).
[1]Average daily feed: Heme vs. Control (P = 0.13).

TABLE 8

Performance in the overall experiment
(boars 47 days, gilts 54 days)

| Treatment | Initial weight kg | Final weight kg | Average daily gain g/d | Average daily feed g/d | Feed/Gain g/g |
|---|---|---|---|---|---|
| Control | 42.6 | 93.7 | 961 | 2335 | 2.448 |
| AP-301 | 43.2 | 93.7 | 948 | 2329 | 2.480 |
| Heme[1,2] | 43.0 | 93.9 | 955 | 2192 | 2.305 |
| FeSO$_4$ | 43.0 | 92.7 | 932 | 2232 | 2.402 |
| Pooled SEM | 0.29 | 0.82 | 15.7 | 64.4 | 0.0641 |

Mean and standard error of 4 pens of 4 pigs (one pen of 3, for treatments control and FeSO$_4$). One pig died at 13 days of Heme.
[1]Average daily feed: Heme vs. Control (P = 0.15).
[2]Feed/Gain: Heme vs. Control (P = 0.15); Heme vs. AP 301 (P = 0.09).

TABLE 9

Least square means and standard errors (S.E.) of carcass quality characteristics in boars.

| Characteristics | n | Control Mean | S.E. | AP-301 Mean | S.E. | HEME Mean | S.E. | FeSO$_4$.7H$_2$O Mean | S.E. |
|---|---|---|---|---|---|---|---|---|---|
| Carcass weight (kg) | 29 | 75.78 | 3.46 | 75.17 | 3.24 | 74.64 | 3.24 | 75.20 | 3.74 |
| Muscle depth[1] (mm) | 29 | 43.09 | 1.73 | 44.30 | 1.62 | 43.90 | 1.62 | 46.20 | 1.87 |
| Fat thickness[1] (mm) | 29 | 16.69$^{ab}$ | 0.90 | 15.05$^a$ | 0.84 | 17.70$^b$ | 0.84 | 17.00$^{ab}$ | 0.97 |

[1]Muscle depth and Fat thickness measured at 6 cm from the mid-line at the ¾ last rib with a Hennessy Grading probe
Means with different superscripts are significantly different (P < 0.05).

TABLE 10

Least square means and standard errors (S.E.) of carcass quality characteristics in gilts.

| Characteristics | n | Control Mean | S.E. | AP-301 Mean | S.E. | HEME Mean | S.E. | FeSO$_4$.7H$_2$O Mean | S.E. |
|---|---|---|---|---|---|---|---|---|---|
| Carcass weight (kg) | 27 | 73.17 | 2.57 | 76.63 | 2.96 | 75.41 | 2.57 | 74.94 | 3.24 |
| Muscle depth[1] (mm) | 27 | 46.40 | 1.71 | 45.53 | 1.98 | 43.70 | 1.71 | 47.84 | 2.16 |
| Fat thickness[1] (mm) | 27 | 16.90 | 0.94 | 16.73 | 1.09 | 17.50 | 0.94 | 15.68 | 1.19 |

[1]Muscle depth and fat thickness measured at 6 cm from the mid-line at the ¾ last rib with a Hennessy Grading probe

TABLE 11

Least square means and standard errors (S.E.) of meat quality characteristics in boars.

| Characteristics | n | Control Mean | S.E. | AP-301 Mean | S.E. | HEME Mean | S.E. | FeSO$_4$.7H$_2$O Mean | S.E. |
|---|---|---|---|---|---|---|---|---|---|
| pH$_{45}$ SM | 29 | 5.96 | 0.08 | 6.01 | 0.07 | 6.02 | 0.07 | 6.04 | 0.08 |
| pH$_{45}$ LD | 29 | 6.11 | 0.07 | 6.28 | 0.07 | 6.22 | 0.07 | 6.28 | 0.08 |
| pHu SM | 29 | 5.47 | 0.02 | 5.48 | 0.02 | 5.48 | 0.02 | 5.49 | 0.03 |
| pHu LD | 29 | 5.42$^a$ | 0.02 | 5.45$^a$ | 0.02 | 5.53$^b$ | 0.02 | 5.49$^{ab}$ | 0.03 |
| L* (Lightness)[1] | 29 | 54.50$^b$ | 0.60 | 51.37$^a$ | 0.57 | 52.66$^a$ | 0.57 | 52.94$^{ab}$ | 0.65 |

TABLE 11-continued

Least square means and standard errors (S.E.) of meat quality characteristics in boars.

| Characteristics | n | Control Mean | S.E. | AP-301 Mean | S.E. | HEME Mean | S.E. | $FeSO_4 \cdot 7H_2O$ Mean | S.E. |
|---|---|---|---|---|---|---|---|---|---|
| a* (Redness)[1] | 29 | 1.89[ab] | 0.21 | 2.16[b] | 0.20 | 1.48[a] | 0.20 | 1.95[ab] | 0.23 |
| b* (Yellowness)[1] | 29 | 4.31[b] | 0.25 | 3.23[a] | 0.24 | 3.15[a] | 0.24 | 3.63[a] | 0.27 |
| C (Chroma)[1] | 29 | 4.74[b] | 0.25 | 3.94[a] | 0.23 | 3.52[a] | 0.23 | 4.18[ab] | 0.27 |
| H(°)$_{ab}$ (Hue)[1] | 29 | 65.89[b] | 3.25 | 56.70[a] | 3.04 | 64.90[ab] | 3.04 | 61.09[ab] | 3.51 |
| Drip Loss LD (%) | 29 | 12.85[b] | 0.58 | 10.14[a] | 0.54 | 10.21[a] | 0.54 | 11.46[ab] | 0.63 |
| Haematin content LD (µg/g muscle) | 29 | 28.78 | 1.77 | 29.26 | 1.65 | 31.15 | 1.65 | 33.31 | 1.91 |

[1]Color measured by spectrochromameter Minolta 2002
Means with different superscripts are significantly different ($P < 0.05$).

TABLE 12

Least square means and standard errors (S.E.) of meat quality characteristics in gilts.

| Characteristics | n | Control Mean | S.E. | AP-301 Mean | S.E. | HEME Mean | S.E. | $FeSO_4 \cdot 7H_2O$ Mean | S.E. |
|---|---|---|---|---|---|---|---|---|---|
| $pH_{45}$ SM | 27 | 5.88[a] | 0.11 | 6.12[ab] | 0.12 | 6.25[b] | 0.11 | 6.14[ab] | 0.14 |
| $pH_{45}$ LD | 27 | 6.21 | 0.09 | 6.42 | 0.10 | 6.26 | 0.09 | 6.34 | 0.11 |
| pHu SM | 27 | 5.46 | 0.02 | 5.44 | 0.02 | 5.50 | 0.02 | 5.50 | 0.03 |
| pHu LD | 27 | 5.49[a] | 0.03 | 5.51[ab] | 0.03 | 5.49[a] | 0.03 | 5.59[b] | 0.03 |
| L* (Lightness)[1] | 27 | 51.22 | 0.58 | 50.60 | 0.67 | 51.28 | 0.58 | 50.50 | 0.74 |
| a* (Redness)[1] | 27 | 1.71 | 0.52 | 2.56 | 0.60 | 2.95 | 0.52 | 2.07 | 0.66 |
| b* (Yellowness)[1] | 27 | 2.65[a] | 0.36 | 3.00[ab] | 0.42 | 3.80[b] | 0.36 | 2.87[ab] | 0.46 |
| C (Chroma)[1] | 27 | 3.20 | 0.49 | 4.00 | 0.56 | 4.32 | 0.49 | 3.57 | 0.61 |
| H(°)$_{ab}$ (Hue)[1] | 27 | 54.92 | 3.44 | 50.67 | 3.97 | 57.80 | 3.44 | 55.14 | 4.35 |
| Drip Loss LD (%) | 27 | 8.12[ab] | 0.77 | 6.39[a] | 0.89 | 8.99[b] | 0.77 | 7.62[ab] | 0.97 |
| Haematin content LD (µ/g muscle) | 27 | 28.79 | 1.30 | 27.17 | 1.51 | 26.21 | 1.30 | 27.25 | 1.65 |

[1]Color measured by spectrochromameter Minolta 2002
Means with different superscripts are significantly different ($P < 0.05$).

As can be seen from the foregoing the invention accomplishes at least all of its objectives.

Having described the invention with reference to particular compositions and methods, theories of effectiveness, and the like, it will be apparent to those of skill in the art that it is not intended that the invention be limited by such illustrative embodiments or mechanisms, and that modifications can be made without departing from the scope or spirit of the invention, as defined by the appended claims. It is intended that all such obvious modifications and variations be included within the scope of the present invention as defined in the appended claims. The claims are meant to cover the claimed components and steps in any sequence which is effective to meet the objectives there intended, unless the context specifically indicates to the contrary.

What is claimed is:

1. A method of decreasing the average daily feed intake of animals comprising:
   administering to an animal a supplement comprising substantially purified heme, said heme containing at least 1800 ppm iron.

2. A method according to claim 1 whereby the supplement is administered to the animals by adding the supplement to the animal's feed.

3. A method according to claim 1 whereby the supplement is administered to the animal ad libitum.

4. A method according to claim 1 wherein said administration is by oral administration.

5. A method according to claim 1 wherein said supplement is administered to animals in an amount greater than 0% and up to 10% by weight of the animal ration.

6. A method according to claim 1 wherein said supplement is administered to pigs.

7. A method according to claim 1 wherein said supplement is administered to a finishing pig.

8. A method according to claim 1 wherein said supplement is administered to an animal selected from the group consisting of: a cat, dog, calf, lamb, chicken, turkey, duck, horse, goat, pig, llama, and human.

9. A method according to claim 1 wherein the heme is isolated from a blood source selected from the group consisting of porcine, bovine, ovine, equine, and avian species.

10. A method according to claim 9 wherein the blood source is selected from the group consisting of porcine and bovine.

11. A method according to claim 1 whereby the heme is substantially free of globin.

12. A method according to claim 11 whereby the heme contains at least 3500 ppm iron.

13. An animal feed comprising an effective amount of heme to decrease the average daily feed intake of animals.

14. An animal feed according to claim 13 whereby the animal feed comprises up to about 10% by weight of the substantially purified heme.

15. An animal feed according to claim 14 whereby the animal feed comprises up to about 5% by weight heme.

16. An animal feed according to claim 13 whereby the heme is substantially free of globin.

17. A method of improving the meat quality of animals comprising: administering to an animal a supplement comprising substantially purified heme, said heme containing at least 1800 ppm iron.

18. A method according to claim 17 whereby the meat quality factors improved are selected from the group consisting of meat color and drip loss.

19. A method according to claim 17 whereby the supplement is administered to the animals by adding the supplement to the animal's feed.

20. A method according to claim 17 whereby the supplement is administered to the animal ad libitum.

21. A method according to claim 17 wherein said administration is by oral administration.

22. A method according to claim 17 wherein said supplement is administered to animals in an amount greater than 0% and up to 10% by weight of the animal ration.

23. A method according to claim 17 wherein said supplement is administered to pigs.

24. A method according to claim 17 wherein said supplement is administered to a finishing pig.

25. A method according to claim 17 wherein said supplement is administered to an animal selected from the group consisting of: a cat, dog, calf, lamb, chicken, turkey, duck, horse, goat, pig, llama, and human.

26. A method according to claim 17 wherein the heme is isolated from a blood source selected from the group consisting of porcine, bovine, ovine, equine, and avian species.

27. A method according to claim 26 wherein the blood source is selected from the group consisting of porcine and bovine.

28. A method according to claim 17 whereby the heme is substantially free of globin.

29. A method according to claim 28 whereby the heme contains at least 3500 ppm iron.

* * * * *

UNITED STATES PATENT AND TRADEMARK OFFICE
CERTIFICATE OF CORRECTION

PATENT NO. : 6,749,872 B2
DATED : June 15, 2004
INVENTOR(S) : Russell et al.

It is certified that error appears in the above-identified patent and that said Letters Patent is hereby corrected as shown below:

Column 5,
Line 40, after "8%" insert -- - --.

Column 8,
Line 13, delete "$^{ab}P$" and insert -- ab = P --, therefor.
Line 38, delete "slaughtor" and insert -- slaughter --, therefor.
Line 44, delete "post-slaughtor" and insert -- post-slaughter --, therefor.

Column 10,
Line 65, insert -- 4 -- before "pens".

Signed and Sealed this

Thirtieth Day of November, 2004

JON W. DUDAS
*Director of the United States Patent and Trademark Office*